United States Patent [19]

Howarth

[11] Patent Number: 4,942,650
[45] Date of Patent: Jul. 24, 1990

[54] FLUID ACTUATED METHOD AND MEANS FOR CONTROLLING A TOOL SLIDE

[76] Inventor: Richard F. Howarth, 2 Bridle La., Blue Bell, Pa. 19422

[21] Appl. No.: 361,731

[22] Filed: Jun. 2, 1989

Related U.S. Application Data

[63] Continuation of Ser. No. 883,580, Jul. 9, 1986, abandoned.

[51] Int. Cl.$^5$ ............................................... B23B 9/04
[52] U.S. Cl. ........................................ 29/38 B; 82/118; 82/129
[58] Field of Search ............... 29/38 A, 38 B; 82/118, 82/119, 129; 408/10, 11, 13, 130; 409/105, 186, 187, 193, 194, 80

[56] References Cited

U.S. PATENT DOCUMENTS

| | | | |
|---|---|---|---|
| Re. 32,211 | 7/1986 | Jerue et al. | 82/1.2 |
| 3,051,023 | 8/1962 | Hirsch | 408/11 |
| 3,259,023 | 7/1966 | Rieger et al. | 408/11 |
| 3,747,444 | 7/1973 | Schubert | 82/3 X |
| 4,255,991 | 3/1981 | Lambert | 82/1 C |
| 4,346,444 | 8/1982 | Schneider et al. | 408/11 |
| 4,388,576 | 6/1983 | Blatt | 82/2 B X |
| 4,441,059 | 4/1984 | Watanabe | 408/11 |

OTHER PUBLICATIONS

"Handbook for Operators Acme-Gridley Multiple Spindle Bar Machines", entire manual.
Servo Slide Operator's Manual by National Acme Company of Cleveland, Ohio, dated Feb. 26, 1988, revised Apr. 25, 1988, Section 1, "Scope".
"New Britan Develops", article from Automatic Machining Magazine, Jun. 1986 Issue.
Series "ESP" Electronic Stroke Position by Atlas Cylinder Corp. of Eugene, Oregon, P.O. Box 2248.

Primary Examiner—Z. R. Bilinsky
Attorney, Agent, or Firm—Frank J. Benasutti

[57] ABSTRACT

A method and means for accurately positioning a tool slide in an automatic machining apparatus. Said method and means utilizing a fluid operated drive means, a linear position detecting means, an encoder means operatively associated with said linear position detecting means, means for controlling fluid flow to said fluid operated drive means and a programmable controller means for receiving and storing control data information and for receiving coded information for comparison to said control data information and for outputting a signal to control the operation of said fluid drive means.

6 Claims, 4 Drawing Sheets

FLUID ACTUATED METHOD AND MEANS FOR CONTROLLING A TOOL SLIDE

This is a continuation of application Ser. No. 883,580, filed July 9, 1986, now abandoned.

BACKGROUND OF THE INVENTION

1. FIELD OF THE INVENTION

The present invention relates to automated machine equipment and in particular automated machine equipment utilizing a tool slide system which will accommodate a plurality of tool holders. One such common machine will be known to those skilled in the art as an automatic screw machine or as a multiple spindle bar machine.

2. DESCRIPTION OF THE PRIOR ART

As will be familiar to those skilled in the art, machine equipment, such as an automatic screw machine, will often have a stock spindle assembly which will comprise a spindle carrier and a number of spindles, each of which will accommodate a length of bar stock. This spindle assembly may contain a number of spindles and it is not uncommon to see a spindle assembly having six or eight spindles positioned around the circumference thereof. Each of the spindles will retain the bar stock during machining operations and will automatically feed the required length of stock for the operation to be accomplished. Generally, an end tool carrier will be positioned on a center line with the spindle assembly and will provide a number of positions for tool holder assemblies. Depending upon the operations to be performed on the stock, one or more tools will be secured to the end tool slide carrier which is arranged to move into the work piece and perform the necessary machining operation and then move away from the work piece to permit rotation of the spindle assembly. As will be understood by those skilled in the art, such an automatic machining apparatus may include cross slides which are arranged perpendicular to the axis through the spindle assembly and the end tool slide carrier. The cross slides, like the end tool slide carriers, are arranged to address the bar stock and perform additional machining operations.

In the prior art, automatic machine screws have utilized mechanical cam means for controlling the address and withdraw of the end tool slide carrier as well as the cross slides. One such prior art apparatus is known as an Acme-Gridley ® multiple spindle bar machine which is available from National Acme, 170 East 131st Street, Cleveland, Ohio 44108. In such a prior art device, the position stock feed, the cross slides and the end tool carrier were controlled through the use of a drum or barrel cam arrangement and a slide roll or cam follower. If a change was desired in any of the mechanical operations of the device, such change was effected by changing the drum cams and/or assembling a plurality of cam parts on the drum to arrive at the desired drum cam configuration. Such a prior art device is illustrated in FIG. 5. Those skilled in the art will be familiar with the technique of changing the drum cam and/or assembling cam sections to a host drum for the purpose of providing a new or different drum cam.

More recently, bar machines have been introduced which utilize cross slides which eliminate the need for barrel or drum cams in the cross slide position through the use of programmable controls and servo mechanisms. One such apparatus is available from National Acme as a 1¼ RA-6 Spindle Servo Slide Bar Machine. However, those skilled in the art will recognize that such a machine still requires that the end tool slide carrier assembly be controlled through the use of the mechanical drum cam and follower mechanisms.

With reference again to FIG. 5, there is shown such a drum cam 500 and follower mechanism 508 from the prior art machines. In such an assembly, the cam portions 501–506 must be changed in order to modify or alter the address and withdraw of the end tool slide carrier assembly. Such modifications are time consuming and require precision assembly of the tool slide cams. In such a prior art construction, a plurality of cam portions are utilized to create a cam track 507 on the barrel or drum 140. The cam follower 508 is then positioned within the cam track and will mechanically move the end tool slide carrier assembly 100 through its address to the work, provide feed where the work is performed on the stock and will then withdrawal the end tool carrier assembly. In addition to modifications to the tool slide cams, it is necessary to adjust a stop rod, not shown, which is positioned on the guide bracket which supports the tool slide during its movement. The stop rod provides positive adjustment for maximum travel by eliminating variations in machine tolerances caused by cam and roller clearances. Such a positive stop is necessary to assure sustaining machine accuracy and repeatability in view of cam wear and cam follower clearances.

Although the prior art devices have proven reliable for mass production of large quantities of the desired article, the complex and time consuming procedure which is required to change the end tool slide movement has resulted in substantial machine set-up cost and adjustment time. In addition to the time spent in setting up the equipment, the substantial cost of such a set-up has limited the utility of such machinery for producing small quantities of the desired article.

In accordance with the prior art difficulties associated with machine set-up and operation, the art has desired a means of rapidly modifying and controlling tool slide systems in general and the end tool slide system in particular.

SUMMARY OF THE INVENTION

In view of the problems associated with the prior art devices, the instant invention incorporates a fluid operated end tool slide carrier assembly which is responsive to a programmable control and eliminates the need for the end tool slide cam systems. The disclosed invention is suitable for use in retrofitting of prior art equipment, as well as, suitable for use in equipment being currently manufactured.

It is an object of the present invention to provide an end tool carrier control mechanism which will rapidly address the work piece, control the tooling during the operation on the work piece and will rapidly withdraw the tooling at the completion of the operation.

It is a further object of the invention to provide an end tool carrier system which will permit a continued monitoring of the tooling operation and will permit adjustment during production without the need to undertake time consuming and expensive modifications associated with utilization of an end tool slide carrier cam system.

DESCRIPTION OF DRAWINGS

FIG. 5 is a partial section of a tool slide actuator in accordance with the prior art.

DESCRIPTION OF THE PREFERRED EMBODIMENT

Figure 1:
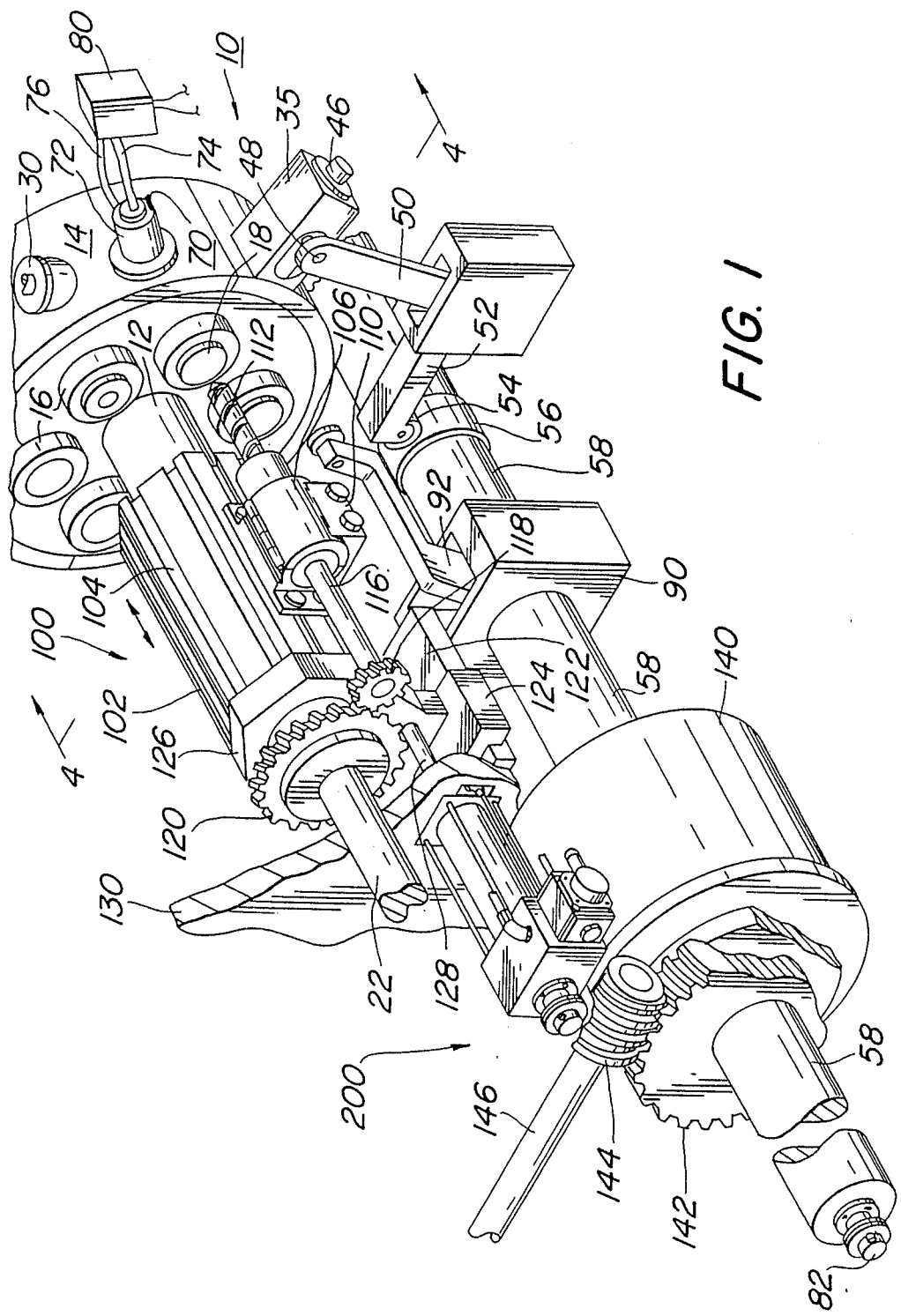
FIG. 1 is a perspective view of a portion of an automated machine apparatus which has been modified to include a means for activating a tool carrier in accordance with my invention.

With reference to FIG. 1, there is illustrated a preferred embodiment of the invention in a retrofit application. The illustrated machine is a multiple spindle bar machine or automated screw machine which will be known to those skilled in the art. Generally, such an apparatus comprises a spindle assembly 10, an end tool slide assembly 100 and a control mechanism, 200, for the end tool slide assembly.

With reference to the spindle assembly 10, it generally comprises a spindle carrier journal 14 and a spindle carrier 13 which is mounted through the center thereof on a spindle carrier shaft 12. Spindle carrier shaft 12 is of sufficient length to extend through end tool carrier assembly 100 and to position the spindle assembly 10 and the end tool carrier assembly 100 on center line with each other. The spindle assembly 10 generally comprises a plurality of work piece spindles 16 which will grip and feed bar stock 18 into position for the selected machining operation. Thus, if the selected machining operation in a given position was a boring operation, the tool, boring bar 112, would be advanced into the bar stock 18 and the operation completed in accordance with the desired depth and size bore. Once the tool had been removed from the work piece, the spindle assembly would index so that the machined stock 18 would move to the next station. If a second operation is desired, it would be preformed at the second station while the first operation is repeated at the first station. Such operation of automatic machining equipment will be known to those skilled in the art. Further details of the spindle assembly as well as a means for locking the spindle assembly during machining operations will be discussed hereinafter.

With respect to the end tool slide assembly 100 it is generally configured to have a plurality of tooling positions which are equal in number to the work piece spindles 16. The end tool slide 102 has a number of planar surfaces to which tools are affixed. In the instant illustration, the end tool slide would have a hexagonal configuration with there being positions for six tools. Each of the planar surfaces has two grooves or slots 104 which will accommodate a tool holder with base, 106. The tool holder 106 is affixed to the tool slide by means of a plurality of mounts 108. In the most common embodiments, the mount 108 will be a nut and bolt assembly with the bolt head being slidably received and retained within the groove or slots 104. A nut is then secured to each of the bolts to securely mount the tool holder 106 on the end tool slide. In the illustrated tool holder with base 106, the tool holder is provided with a clamp 110 which will securely fix the tool and the tool holder. The tool 112 is secured by means of a chuck 114 as will be known to those skilled in the art. The tool is driven through drive shaft 116 which is affixed to driven gear 118 and is ultimately powered by drive gear 120. Power for the tooling operations is provided via drive shaft 22 which is connected through a suitable gear train and pulleys, not shown, to the power source of the machine. Drive shaft 22 is on centerline with and extends through the spindle carrier shaft 12. An adjustment nut 24 is provided on drive shaft 22 to adjust the end play of the tool slide 102.

End tool slide assembly 100 will move toward and away from spindle assembly 10 on spindle carrier shaft 12. The movement of the end tool slide assembly 100 is accomplished through end tool slide guide carriage 126 which is mounted on a guide 124 for movement to and from on guide plate 122. Movement of the end tool assembly 100 is achieved through rod 128 which is provided with a threaded end 129 extending through a aperture in the base of end tool guide carriage 126. Further details of this assembly will be described hereinafter. With respect to movement of the end tool slide assembly 100, this is accomplished via actuator means 200 which will be described in more detail hereinafter.

With respect to the remainder of the apparatus illustrated in FIG. 1, the wall 130, shown as a fragment, is a portion of the preexisting machine casing of the retrofitted equipment. Although wall 130 as shown is not necessary to the invention and forms no part thereof, it is utilized as a means of mounting the actuator means 200 and may be replaced in new construction by a suitable bracket or mounting beam assembly.

As would be known to those skilled in the art, a common shaft 58 will extend beneath the tool carrier assembly 100 and the spindle assembly 10. Shaft 58 performs several functions which are useful in automated machining equipment. In the first function, shaft 58 will have a cam lobe 56 affixed thereto which is ultimately used to control a locking pin assembly 35. Through rotation of shaft 58, lobe 56 is rotated through high and low spots and is followed by roller 54. The movement of lobe 56 is translated through roller 54 to a push rod 52 which is affixed to and controls the movement of connecting rod 50. Through connector pin 48 connecting rod 50 will actuate the locking pin within locking pin assembly 35. Further details of locking pin assembly 35 will be described hereinafter.

In addition to actuation of the locking pin, shaft 58 is also utilized to actuate a stock stop assembly 90, which does not form part of the instant invention. As will be known to those skilled in the art stock stop assembly 90 is comprised of a barrel cam or drum cam which is mounted on shaft 58 and will cause stock stop rod 92 to rise up and stop stock which is fed through the spindle assembly 10 at the proper distance to achieve the desired length of stock. Also mounted on shaft 58 is a barrel spacer 140 in the present embodiment. Barrel spacer 140 is not required for operation of the invention but is utilized in the retrofit embodiment as a spacer due to the fact that the barrel or drum cam assembly has been eliminated and this assembly previously formed part of the modified equipment. As will also be known to those skilled in the art, a ring gear 142 is mounted on shaft 158 and is driven by worm gear 144 which is mounted on shaft 146. However, the gear train does not form part of the present invention and is not illustrated.

Figure 2:
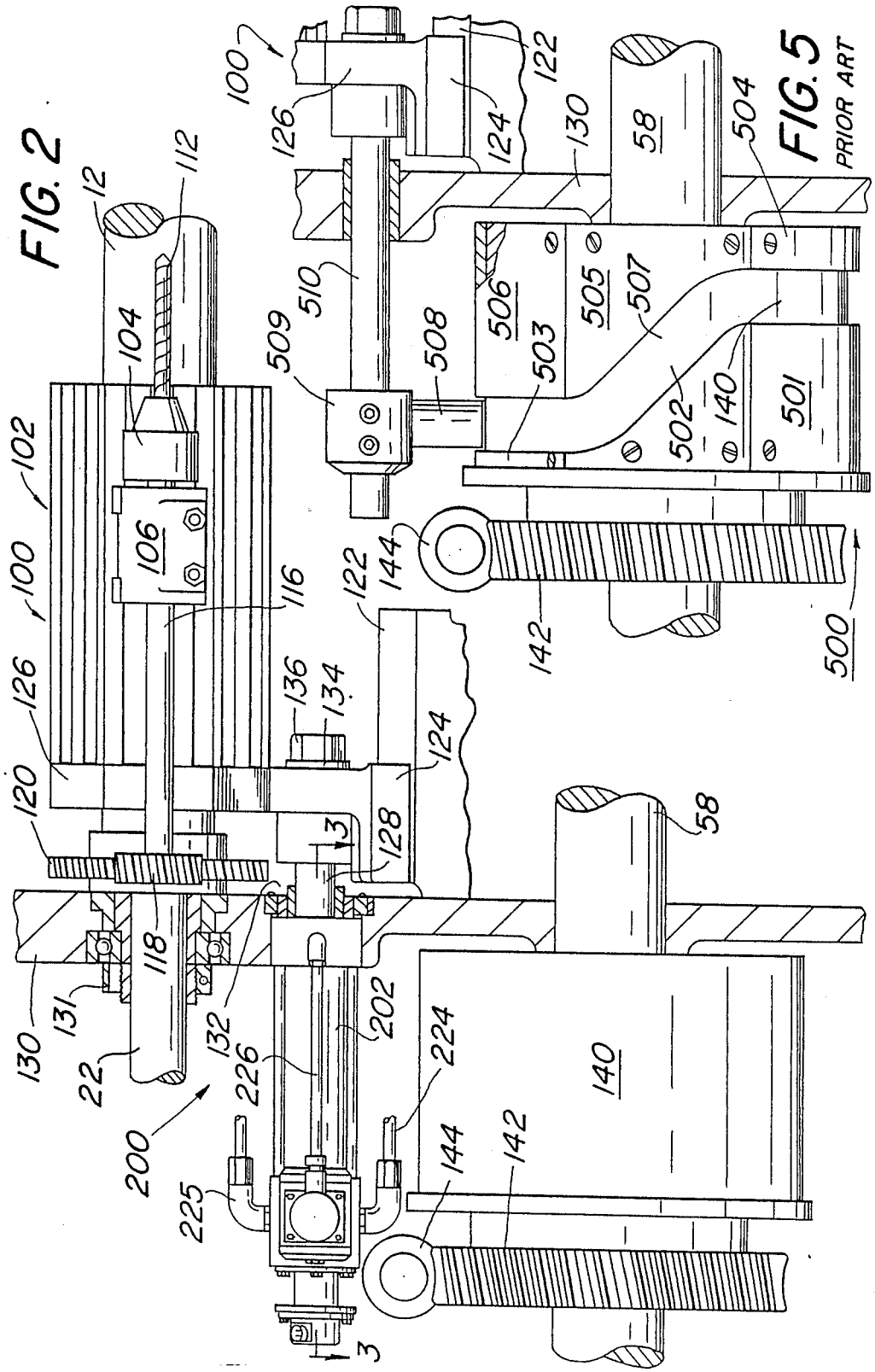
FIG. 2 is a side elevation of the tool carrier according to my invention in the environment as depicted in FIG. 1.

With reference to FIG. 2, there is illustrated a side elevation of the end tool slide assembly 100 and the actuating means 200. As noted previously, end tool slide 102 is mounted on end tool guide carriage 126 and moves along spindle carrier shaft 12. Carriage 126 rests upon the guide plate 122 via guide 124. It will be understood by those skilled in the art that the guide plate 122 is of sufficient length to permit end tool slide assembly to move to and fro a sufficient distance to achieve the necessary work operation. Likewise, it will be recognized that tool holder and base 106 may be positioned at various locations along the length of the end tool slide 102. End tool guide carriage 126 is secured to rod 128 via a washer and nut assembly 134, 136. Actuator means 200 is mounted to the wall 130 with the bushing assembly 132, including a sealing surface surrounding shaft 128 (see FIG. 3) of actuator means 200 confined by wall 130. Such mounting provides the actuating means 200 with a fixed rigid reference point with respect to the location of the tool slide assembly 100. Likewise, it will be noted that spindle drive shaft 22 is mounted through wall 130 via a bearing and seal assembly 131.

Figure 3:
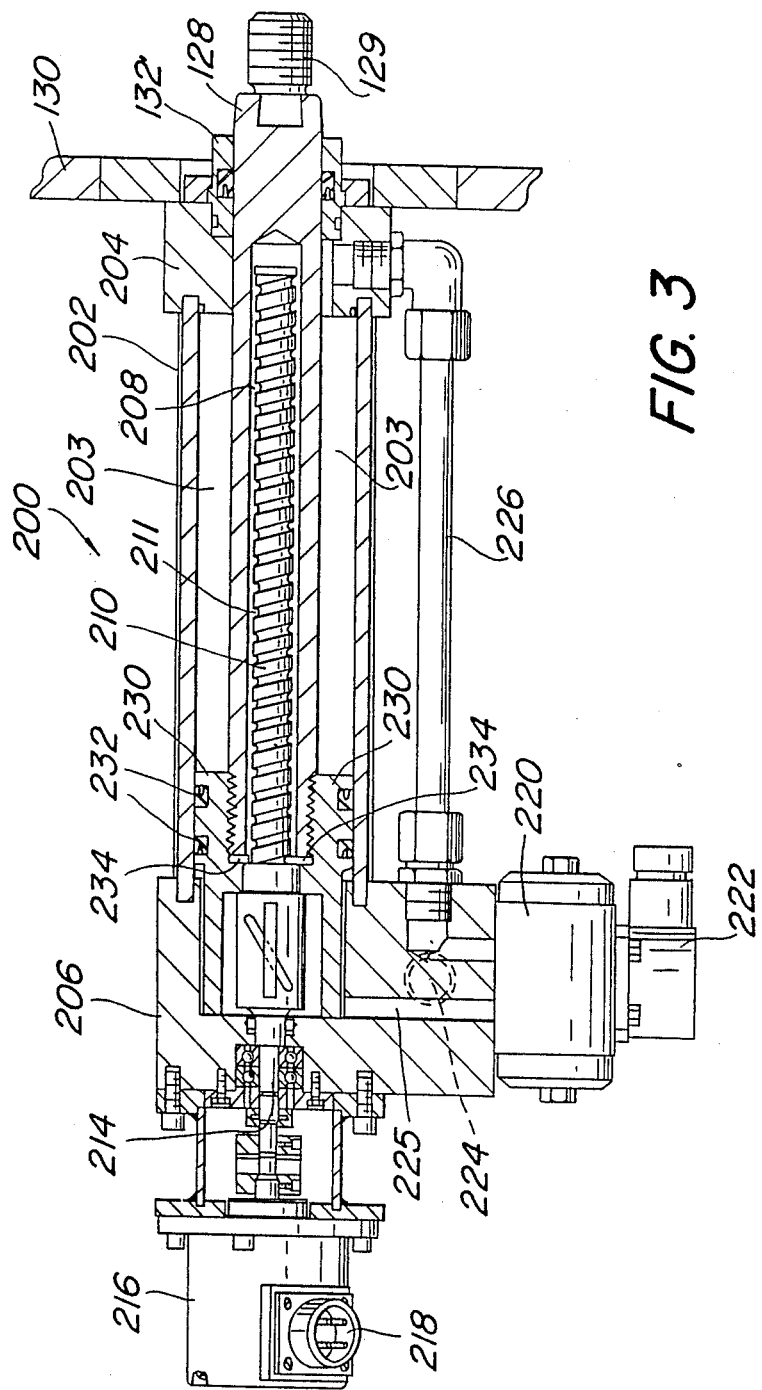
FIG. 3 is a partial section, along the line 3—3 of FIG. 2, of a actuator means in accordance with my invention.

With reference to FIG. 3, the operation and use of actuator means 200 will be described. As noted previously, rod 128 extends beyond the wall 130 and has a threaded end 129 for securement to the carriage 126. Actuating means 200 is generally comprised of a housing 202 with end caps 204 and 206. End caps 204 and 206 seal the housing 202 against fluid loss. Shaft 128 extends through end cap 204 and into the interior of housing 202. Surrounding shaft 128 within housing 202 is an open fluid passage 203. A bore 208 is provided in the center of rod 128. Mounted within the bore 208 is a machine ball screw 10. Machine ball screw 210 is connected to and operatively associated with a ball nut 212 and shaft 214.

Rod 128 is connected at its distal end, via threads, to a plunger piston 230. Piston 230 is sealed against housing 202 via the seals 232. Piston 230 is also provided with a retainer 234 which moves with piston 230 and rod 128. As plunger 230 is moved through the housing 202 toward end cap 204, rod 128 is extended and ball screw 210 is rotated proportionally to the linear movement of rod 128 by the ball nut 212. Ball screw 210 extends through recirculating ball nut 212 and its rotational movement, caused by corresponding travel of ball nut 212, is transmitted through shaft 214 into a rotary encoder 216. In the preferred embodiment rotary encoder 216 is a digital encoder, however, resolvers and analog means for encoding the information obtained through the ball screw 210 and ball nut 212 may be utilized.

In the preferred embodiment, actuating means 200 is a numerically controlled hydraulic cylinder. Such a hydraulic cylinder is available from Atlas Cylinder Corporation, 29289 Airport Road, Eugene Oreg. 97402-0079 as Atlas ESP-1 servo actuator. In such a cylinder, extension of the rod 128 is accomplished through a servo valve 220 and a servo valve controller 222. In response to servo valve controller 222, servo valve 220 will permit pressurized fluid supplied from fluid line 225 to flow through internal fluid line 228 to exert a pressure at the rear of plunger 230 and urge the rod 128 forward. For retraction of the rod 128, servo valve controller 222 and servo valve 220 direct the fluid through fluid line 226 and into the forward end of the housing 202 at end cap 204. Fluid line 224 provides an exhaust line for the fluid supply. In this manner, rearward pressure is applied against the piston 230 and rod 128 is retracted. In either direction of travel, rotational movement of the ball screw 210 is communicated through shaft 214 and a commensurate signal will be generated defining the linear movement of rod 128.

In actual operation of actuator 200, control is accomplished through the utilization of a Fanuc model J programmable controller, available from General Numeric Corporation, 390 Kent Avenue, Elk Grove Village, Ill. 60007.

In the preferred embodiment, all program control data is entered by means of a keyboard, using an individual menu CRT display for all data related to the end tool slide. This approach permits clear indications of all parameters that are required, such as length of movement, rate of feed, dwell time, constant velocity and rate of retraction. In addition, the rate of feed and the rate of retraction may be segmented into a rapid approach and rapid retraction segment and a slower more controlled segment for approaching the bar stock or for removing the tool from the machined piece. In addition to the keyboard method, a host computer, punched tape reader, magnetic cassette reader or other comparable serial data communication device could be utilized in combination with the programmable controller.

In addition to providing the initial data, a feed back loop is created which provides continued monitoring of the actual machining operation parameters and a comparison against the control data. Other messages are displayed as necessary and the screen display is held until such time as proper data is provided within the limits of the control data or the error is corrected. In this manner, quality of the product produced is enhanced and the quantity of product rejected is reduced. In addition to allowing error messages for production purposes, the present system provides a means of constantly checking machine wear so as to avoid errors which are introduced as a result of machine defects or wear induced characteristics. In the event that the closed feed back loop information does not meet the control data requirements, the operation is automatically halted.

In addition to utilization of the programmable controller for the end tool slide, it is possible to control all servo operated cross slides along with the end tool slide. Information may be incorporated for each of the various tool slides as well as incorporation of offsets to compensate for tool wear and separate offsets to compensate for variations in spindle positions.

In addition to the increased control and monitoring benefits obtained with the present invention, variations can be made in the selected stroke length, feed rate and dwell of the end tool slide by changes in the programming information without any need to make mechanical adjustments or replacements as existed in the prior art with drum or barrel cam mechanisms. The use of a fluid operated cylinder as a driving force likewise allows the application of numerical control technology to the slide when there does not exist sufficient space to apply conventional lead screw and motor arrangements or rack and pinion arrangements or printed circuit motor drive forces.

In the preferred embodiment, the programmable controller incorporates a DAC (digital to analog convertor) which will output an analog velocity command signal to servo valve controller 222. This command signal includes acceleration, deceleration and constant velocity information to obtain the desired end tool slide control. Through the ball screw 210 the slide position is continually monitored to assure accurate control and a feed back loop is created based on position and velocity.

In connection with my invention, I have discovered that the accuracy of the machine process in automated machining equipment can be further improved through utilization of a hydraulically operated spindle carrier clamping and anti-rotation mechanism. As will be recognized by those skilled in the art, the spindle carrier 13 must be provided with a tolerance or clearance which will permit the spindle carrier to rotate freely within the spindle assembly during movement of the work piece. Although the spindle assembly generally rotates about carrier shaft 12 and is positioned on centerline therewith, it will be recognized that there is a need to positively lock the assembly after the spindles have rotated into position. The prior art has recognized the necessity of stablizing the spindle carrier assembly and has provided mechanisms which attempt to accomplish this task. Such mechanisms have included locking mechanisms alone or in combination with braking mechanisms. As will be recognized by those skilled in the art, mechanically operated spindle carrier clamping mechanisms have been utilized in certain applications on large machines, however, shot pin arrangements are most common.

Figure 4:
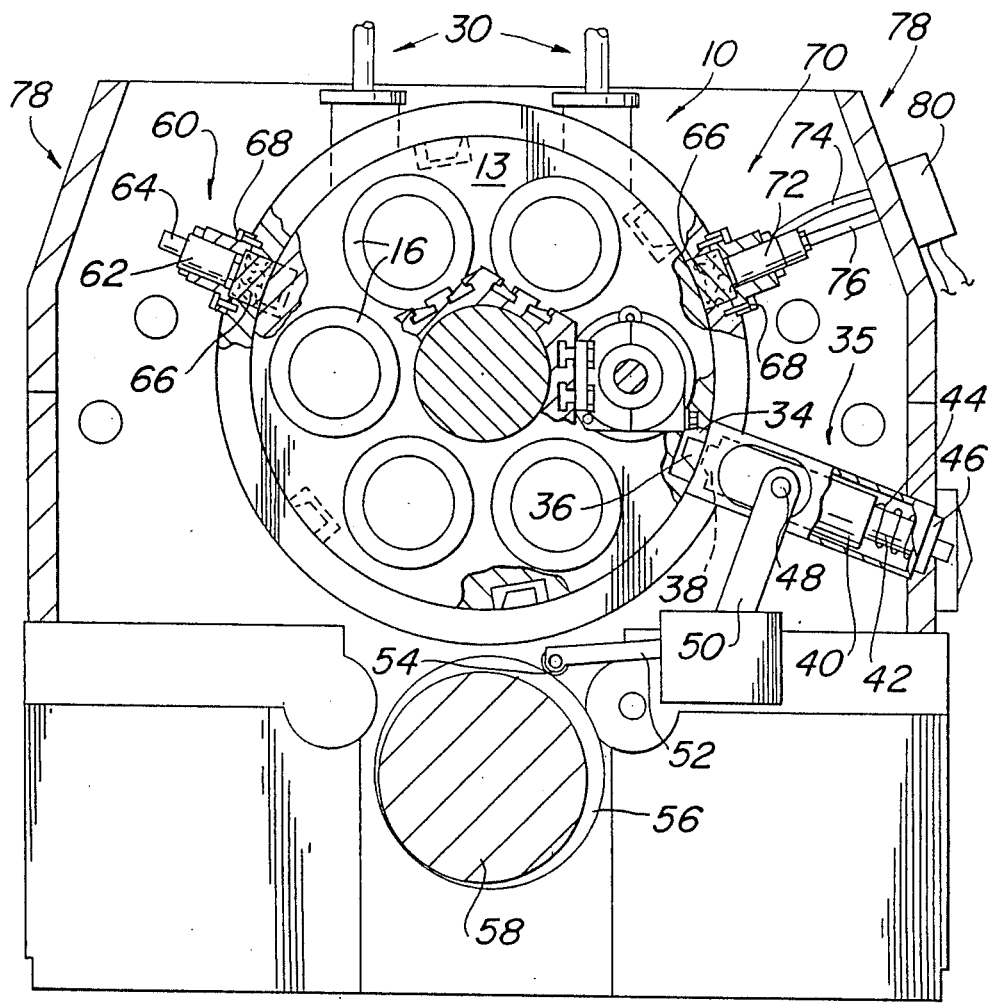
FIG. 4 is a partial section of a spindle carrier assembly, in the direction of the arrows 4 of FIG. 1 and shown in its environment in the apparatus, of an improved spindle stop or anti-rotation means in accordance with my invention.

To accommodate the shot pin arrangement, see FIG. 4, the spindle carrier is provided with a number of locking pin blocks 34 which are positioned to be located opposite locking pin housing 35. Each locking pin block 34 had a locking pin opening 36 which is dimensioned to receive the locking pin head 38. As will be recognized by those skilled in the art based upon the position of the cam lobe 56 push rod 52 would actuate connecting rod 50. Depending upon the position of the cam, connecting rod 50 will control the locking pin body 4 and insert or withdraw the locking pin head from locking pin opening 36. In the withdrawn position, the spring 44 is in a loaded condition. As the position of the cam lobe 56 is rotated, connecting rod 50 would be drawn forward and the locking pin would be driven by the spring so that locking pin head 38 engages locking pin opening 36 and secures spindle carrier assembly 13. As will be appreciated such devices are homing devices and are subject to wear and tolerances. Additionally, such devices do not provide means of eliminating rotational movement when tooling operation begins.

In addition to locking pin or sharp pin arrangements, mechanically operated clamping mechanisms have sometimes been provided. Such mechanically operated clamping mechanisms depend upon a gear, train and cam system with a cam follower and plunger arrangement which will operate a clamping shoe assembly as is indicated in FIG. 4 at 30. Such clamping shoe assemblies will be known to those skilled in the art. In addition to use of the clamping shoe assembly, such mechanical assemblies often include stubbing shoes, not shown, which are generally located by the clamping shoes 30. However, such devices like the locking pin arrangement do not provide positive anti-rotation control due to mechanical wear and tolerances.

Despite the prior art attempt of locating and controlling the position of the spindle, I have found that it is beneficial to utilize a passive and a fluid operated brake either in place of spindle carrier clamping shoes or in conjunction therewith. In my embodiment, I provide a passive brake block assembly or rubbing block 60. The passive brake block assembly is assembled to the spindle assembly by mounting means 68. A pressure block 62 is provided for adjusting a brake block 66 in accordance with the clearance associated with spindle carrier 13. Adjustment of the brake block 66 is accomplished through threaded shaft 64 which is secured by a lock nut, not shown. Passive brake block assembly 60 is located opposite to and substantially on centerline with the locking pin housing 35.

Passive brake block assembly 60 provides a counter force to that associated with a locking pin mechanism. As a result of usual machine wear, momentum and acceptable tolerances, the shot pin mechanism will, over time, tend to create slight mis-alignments in the spindle carrier. Thus, the passive brake block provides a positive means of countering the force of the locking pin mechanism and maintaining the desired control over initial positioning.

In addition to the passive brake block assembly, I provide an active brake block assembly 70 which is positioned on a radius of the spindle carrier assembly in the quadrant opposite the passive brake block assembly 60. Active brake block assembly 70 is secured by mounts 68 in the manner similar to the passive assembly. Likewise, the active brake block assembly utilizes a brake block 66 for contact with the spindle carrier 13. However, with active brake block assembly 70, I utilize a hydraulic cylinder which is double acting with hydraulic line 74 and 76 providing actuation means. One suitable double acting cylinder for this application is the ENERPAC Model RWT-39, available from J. Fegley & Sons, Pottstown, Pa. The operation of active brake block assembly 70 is controlled though a hydraulic valve 80. Through operation of the hydraulic valve 80, the respective hydraulic lines 72 and 74 will be activated to either engage or disengage the brake block 66 from the spindle assembly. Control of the hydraulic valve is achieved through the rotary encoder 82. Rotary encoder 82 is associated with the shaft 58 which is in time with the stock feed, stock feed stop and the lock pin mechanism.

In operation, encoder 82 will encode the position of shaft 58 and will relay this information to a programmable controller. In the instant embodiment, the programmable controller is the same controller which is utilized to control the end tool slide mechanism. Since the timing sequence for each of the operations is known, the control data in the programmable controller will permit rotation of the spindle assembly and actuation of the lock pin prior to engagement of the active brake assembly 70. Although the actuation of the brake assembly 70 takes place after actuation of the lock pin mechanism, its application is almost instantaneous.

Through the use of the passive brake, I am able to accomplish better tolerances then are available through utilization of just the lock pin mechanism and therefore, achieve better alignment of the work pieces. Through utilization of the active brake assembly 70, I am able to apply a positive locking pressure which will secure the spindles against any rotational movement which may be induced due to tolerances or may be induced due to a tooling operation. In addition to the foregone advantages, it will be recognized by those skilled in the art that hydraulic application of the brake assembly permits quicker application and continued adjustment to assure maximum application at all times. In addition, utilization of the encoder in combination with the disclosed end tool slide actuating means provides improved timing of the various functions and more accurate location during operation.

I claim:

1. In combination with a multiple spindle bar machining apparatus of the type in which an end-tool slide assembly moves along a shaft to bring machining tools into contact with work pieces, means for controlling the movement of said end tool slide assembly along said shaft, comprising:
   (a) a piston rod attached to the end tool slide assembly and parallel to said shaft;
   (b) a hydraulic drive for driving said piston rod to move the end tool slide assembly along the shaft, said hydraulic drive having a servo valve controller means to control the movement of the piston rod in response to received servo signals, movement detecting means responsive to linear movement of the piston rod, and converting means for converting said linear movement into proportional rotary movement;
   (c) encoder means operatively associated with said hydraulic drive to encode the rotary movement into coded electrical signal information indicating the linear movement of the piston rod; and
   (d) programmable controller means for entering and storing control data representing the desired movement of the piston rod, for receiving the coded signal information from the encoder means and comparing the same to the stored control data, and for outputting an appropriate servo signal to the hydraulic controller to position the piston in accordance with the control data.

2. An apparatus as in claim 1, wherein the encoder means encodes the rotary movement into a digital electrical signal, and the control data stored in the programmable controller is a digital electrical signal.

3. An apparatus as in claim 2, wherein the servo signal which is output from the programmable controller to the servo valve controller is an analog electrical signal.

4. In a multiple spindle bar machining apparatus of the type in which an end tool slide assembly moves along a shaft to bring machining tools into contact with work pieces, a modification to improve control of the movement of the end tool slide assembly along the shaft, where the unmodified apparatus used a mechanical cam means for such movement, comprising:
   (a) a piston rod attached to the end tool slide assembly and parallel to said shaft;
   (b) a hydraulic drive for driving said piston rod to move the end tool slide assembly along the shaft, said hydraulic drive having a servo valve controller to control the movement of the piston rod in response to received servo signals, movement detecting means responsive to linear movement of the piston rod, and converting means for converting said linear movement into proportional rotary movement;
   (c) encoder means operatively associated with said hydraulic drive to encode the rotary movement into coded electrical signal information indicating the linear movement of the piston rod; and
   (d) programmable controller means for entering and storing control data representing the desired movement of the piston rod, for receiving the coded signal information from the encoder means and comparing the same to the stored control data, and for outputting an appropriate servo signal to the hydraulic controller to position the piston in accordance with the control data.

5. An apparatus as in claim 4, wherein the encoder means encodes the rotary movement into a digital electrical signal, and the control data stored in the programmable controller is a digital electrical signal.

6. An apparatus as in claim 5, wherein the servo signal which is output from the programmable controller to the servo valve controller is an analog electrical signal.

* * * * *

UNITED STATES PATENT AND TRADEMARK OFFICE
CERTIFICATE OF CORRECTION

PATENT NO. : 4,942,650

DATED : July 24, 1990

INVENTOR(S) : Richard F. Howrath

It is certified that error appears in the above-identified patent and that said Letters Patent is hereby corrected as shown below:

At Column 3, line 46, delete "18" and replace with --20--.

At Column 5, line 36, delete "10" and replace with --210--.

Signed and Sealed this

Seventeenth Day of March, 1992

Attest:

HARRY F. MANBECK, JR.

*Attesting Officer*     *Commissioner of Patents and Trademarks*